3,094,893
DRILLING AND TAPPING SCREWS
Bert A. Lindstrom, Rockford, Ill., assignor to Elco Tool and Screw Corporation, Rockford, Ill., a corporation of Illinois
Filed Nov. 27, 1959, Ser. No. 855,843
3 Claims. (Cl. 85—47)

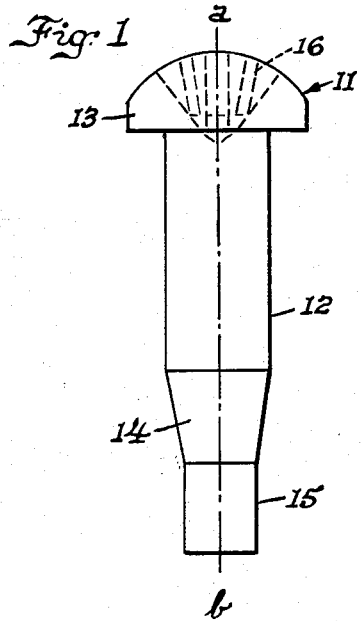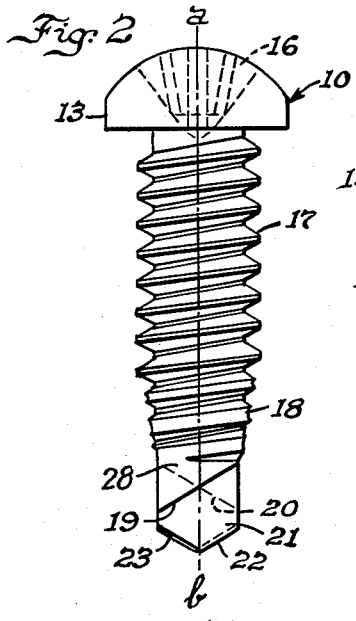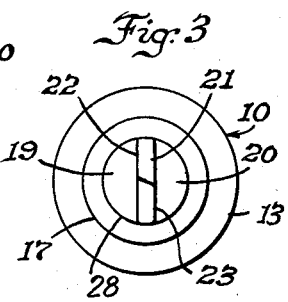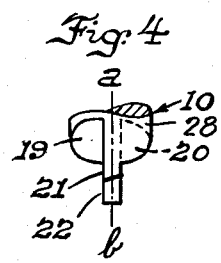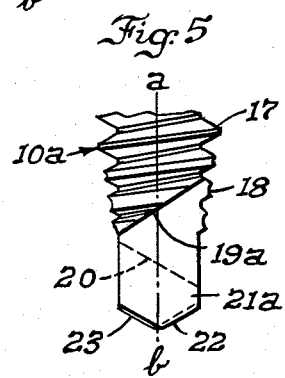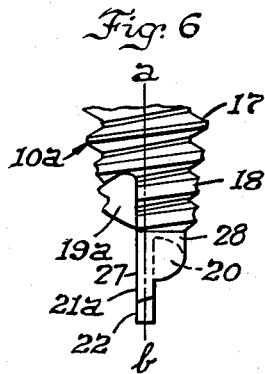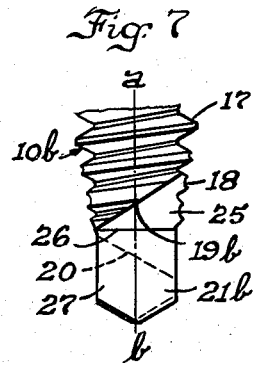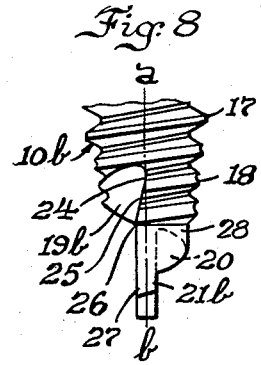
Inventor
Bert A. Lindstrom … Patented June 25, 1963

This invention relates to screws intended for fastening purposes generally and designed to drill and tap the holes therefor in the application thereof to sheet metal of various kinds and thicknesses, namely, steel, copper, aluminum, and brass (sheet or cast) and also various plastics, and various woods and composition materials.

The screws of my invention are made with different kinds of cutaway portions on the opposite sides of the entering drill bit end to suit different thicknesses of materials and different kinds of materials, so that they are adaptable to a wider range of uses. Thus, for thinner materials, (up to say 1/32" thickness) the opposite sides of the drill bit end may be cut away symmetrically for chip clearance up to where the threads taper down to zero for tapping, but for thicker materials, at least one side of the entering end should be cut away higher up for chip clearance, almost as far as the first full diameter holding threads, whereby to insure near completion of the tapping by the tapering end threads before full diameter threads enter the tapped hole, and accordingly facilitate the driving of the screw.

In the screws for use in thicker materials, in cutting away higher up on one side of the entering end, I may also cut away at least at the upper end of this cut-away portion deep enough to at least the diametrical plane through the axis of the screw, if not slightly beyond, with a view to insuring a better tapping action than would be obtainable otherwise.

The invention is illustrated in the accompanying drawing, wherein—

FIG. 1 is a side view of an unthreaded screw blank showing the taper just above the drill bit end where the tapering tapping threads are formed;

FIGS. 2 and 3 are a side view and an end view, respectively, of a drilling and tapping screw made in accordance with my invention;

FIG. 4 is a side view of the entering end portion of the screw of FIG. 2 taken at right angles to FIG. 2;

FIGS. 5 and 6 are side views taken 90° apart showing the entering end portion of another drilling and tapping screw made in accordance with my invention having one side of the entering end cut away higher up for chip clearance, this screw being intended for use in thicker materials, and FIGS. 7 and 8 are views similar to FIGS. 5 and 6 showing the entering end portion of still another drilling and tapping screw made in accordance with my invention, in which at least the upper end of the cut-away portion on the one side that is cut away higher up is cut deep enough to at least intersect the diametrical plane through the axis of the screw.

Similar reference numerals are applied to corresponding parts in these views.

Referring first to FIGS. 1 to 4, the screw indicated there generally by the reference numeral 10 is made from a steel blank like that shown at 11 in FIG. 1, the blank comprising a cylindrical shank 12 with a head 13 of any suitable or preferred shape on its upper end. The lower end portion 14 of the shank is tapered and terminates in a relatively short end portion 15 of reduced cylindrical form. The head 13 may be slotted diametrically in the usual way or have a cross-shaped socket 16 in the center of the top thereof adapted to receive a cross-shaped bit of a screw driver.

The blanks 11, in the quantity production of the drilling and tapping screws of my invention, are:

(1) First rolled to provide the full holding threads 17 on the shank 12 and the partial entering threads 18 on the tapered lower end portion 14;

(2) Then broached on both sides of the reduced cylindrical end portion 15 in equally spaced parallel relationship to a diametrical plane through the axis $ab$ at an angle of approximately 30° with respect to a plane at right angles to said axis but in opposite directions, as indicated by the oppositely inclined chip-deflecting surfaces shown at 19 and 20, to define a fairly thin drill bit portion 21 of approximately the full length of the reduced cylindrical end portion 15;

(3) Then broached on the extremity of the drill bit portion 21 to a V shape to define cutting edges 22 and 23 on opposite sides of center, properly correlated to the hand of the threads 17—18 (right hand) to drill a hole in the work when the screw is turned in a clockwise direction;

(4) Then hardened to prevent blunting of the cutting edges 22 and 23 of the drill bit, and the screw threads 17 and 18, and (5) Finally plated as desired, or left as is.

In the screw 10a of FIGS. 5 and 6, the same procedure is followed, but in the broaching step (No. 2 above), the one side is broached higher, as indicated at 19a to intersect at least two of the three partial threads 18 with a view to increased chip clearance as is important in thicker materials, to insure near completion of the tapping of the hole drilled by the drill bit 21a by the tapered end threads 18 before the full diameter threads enter the tapped hole, thus facilitating the driving of the screw into the material.

In the screw 10b of FIGS. 7 and 8 the same procedure is followed as in making the screw 10a of FIGS 5 and 6, the one side being broached higher than the other side, as indicated at 19b to intersect at least two of the three partial threads 18 with a view to increased chip clearance, important in thicker materials, so that the tapping of the hole drilled by the drill bit 21b by the tapered end threads 18 is nearly completed before the full diameter threads enter the tapped hole, thus facilitating the driving of the screw into the material. However, in this screw the broaching, at least at the upper end of the cut-away portion, is deep enough to at least reach a diametrical plane through the axis $ab$ of the screw, as indicated at 24 in FIG. 8, if not slightly beyond that plane, with a view to insuring a better tapping action than would be obtainable otherwise. To avoid weakening the screw too much, the broaching below this deepest point 24 is at an acute angle with respect to the aforesaid diametrical plane through the axis $ab$, as shown at 25 in FIG. 8 to the line 26 of intersection with the plane 27 of one side of the drill bit portion 21b. The plane 27 is also indicated in FIG. 6 better to emphasize the angling inward at 25 in FIG. 8 toward the deepest portion 24 at the upper end of the cut-away portion. Obviously, if the angle at 25 with respect to the diametrical plane through the axis $ab$ were increased slightly, the deepest portion 24 at the upper end of the cut-away portion would be slightly beyond the diametrical plane through the axis $ab$, but the construction shown in FIG. 8 is preferred to that construction, because the desired result of better tapping action is obtained without too much weakening of the entering end portion of the screw.

The screws shown in FIGS. 1 to 4 are best adapted for use in thinner materials, say up to 1/32" thick. The screws shown in FIGS. 5 to 8 are suitable for use in thicker materials.

The main advantage in the use of these screws over screws of the piercing and tapping type is the greater speed with which they can be entered in the work and driven home, but there is a further important advantage from the standpoint that these screws cut clean holes and leave very little if any projecting burrs. Consequently, these screws take hold much more uniformly, because the holes made by the drill bit end portions thereof 21, 21a and 21b are so uniform. There is also the advantage that there is less risk of an inexperienced operator not getting the desired results with one of these screws because of a failure to operate the screw properly in its entering stage, whereas with screws of the piercing and tapping type too much depended upon the screw taking hold properly in the piercing operation, but with the present constructions the drill bit end portions drill the holes so uniformly well that there is never any doubt about the screw taking hold immediately upon completion of the drilling operation. Also, with the present constructions, the cylindrical drill bit shank 28 serves as a centering pilot for the screw so that the entering threads 18 are certain to tap the hole for the threaded reception of the holding threads 17 on the shank.

It is believed the foregoing description conveys a good understanding of the objects and advantages of my invention. The appended claims have been drawn to cover all legitimate modifications and adaptations.

I claim:

1. A drilling and tapping screw comprising a generally cylindrical shank having an entering end portion that includes a drilling tip portion ahead of a tapping portion, the latter having a plurality of partial entering threads defined thereon, said entering end portion being ahead of a holding portion of the shank on which a plurality of full size holding threads are defined as a continuation of the entering threads, and an enlarged head integral with the shank at the opposite end from the drilling tip made to accommodate a screw driving tool, the external diameters of the full size threads on the holding portion being constant over the axial extent of said portion, the external diameter of the partial threads on the tapping portion diminishing toward the drilling tip, the opposite sides of said drilling tip portion being removed to form equally spaced planar parallel portions with respect to a diametrical plane through the axis of said shank to define a drill bit, one of said sides being cut away higher up on the shank than on the other side to a level to remove at least the crest of two partial entering threads, said drill bit having its extremity V-shaped to define a tip on the axis of the screw and defining cutting edges on opposite sides of the entering end thereof which face in opposite directions and in such a relationship to the aforesaid threads to drill a hole in a piece of work when the screw is turned in the direction of threading said shank into the said hole, the cut away portions on opposite sides of said drilling tip portion having defined at the upper extremities thereof oppositely-inclined chip deflecting surfaces, each of which is inclined in the same direction with respect to the cutting edge on the same side of the drill bit, said one side cut away higher up on the shank being configured to present more than 180° of bearing area in a diametrical plane in the shank area having said two partial threads.

2. A drilling and tapping screw comprising a generally cylindrical shank having an entering end portion that includes a drilling tip portion ahead of a tapping portion, the latter having a plurality of partial entering threads defined thereon, said entering end portion being ahead of a holding portion of the shank on which a plurality of full size holding threads are defined as a continuation of the entering threads, and an enlarged head integral with the shank at the opposite end from the drilling tip made to accommodate a screw driving tool, the external diameters of the full size threads on the holding portion being constant over the axial extent of said portion, the external diameter of the partial threads on the tapping portion diminishing toward the drilling tip, the opposite sides of said drilling tip portion being removed to form equally spaced planar parallel portions with respect to a diametrical plane through the axis of said shank to define a drill bit, one of said sides being cut away higher up on the shank than on the other side to a level to remove at least the crest of two partial entering threads, the upper portion of the latter cut away portion which includes said partial entering threads being cut away at an acute angle with respect to the plane of the drill bit and extends at least to the diametrical plane through said drill bit, said drill bit having its extremity V-shaped to define a tip on the axis of the screw and defining cutting edges on opposite sides of the center thereof which face in opposite directions and in such a relationship to the aforesaid threads to drill a hole in a piece of work when the screw is turned in the direction of threading said shank into the said hole, the cut away portions on opposite sides of said drilling tip portion having defined at the upper extremities thereof oppositely-inclined chip deflecting surfaces, each of which is inclined in the same direction with respect to the cutting edge on the same side of the drill bit.

3. A drilling and tapping screw comprising a generally cylindrical shank having an entering end portion that includes a drilling tip portion ahead of a tapping portion, the latter having a plurality of partial entering threads defined thereon, said entering end portion being ahead of a holding portion of the shank on which a plurality of full size holding threads are defined as a continuation of the entering threads, and an enlarged head integral with the shank at the opposite end from the drilling tip made to accommodate a screw driving tool, the external and root diameters of the full size threads on the holding portion being constant over the axial extent of said portion, the external diameter of the partial threads on the tapping portion diminishing toward the drilling tip but the root diameter of said partial threads being constant over the axial extent of said tapping portion, the opposite sides of said drilling tip portion being removed to form equally spaced planar parallel portions with respect to a diametrical plane through the axis of said shank to define a drill bit, said drill bit having a cylindrical pilot portion between the drill bit and the first partial entering thread to guide the latter into the hole to start the tapping, the length of the pilot portion being at least equal to the thickness of the material drilled, said drill bit portion also having its extremity V-shaped to define a tip on the axis of the screw and defining cutting edges on opposite sides of the center thereof which face in opposite directions and in such a relationship to the aforesaid threads to drill a hole in a piece of work when the screw is turned in the direction of threading said shank into the said hole, the cut away portions on opposite sides of said drilling tip portion having defined at the upper extremities thereof oppositely-inclined chip deflecting surfaces, each of which is inclined in the same direction with respect to the cutting edge on the same side of the drill bit.

References Cited in the file of this patent

UNITED STATES PATENTS

| Number | Name | Date |
|---|---|---|
| 2,388,482 | Haynes | Nov. 6, 1945 |
| 2,479,730 | Dewar | Aug. 23, 1949 |
| 2,575,332 | Cummins | Nov. 20, 1951 |
| 2,654,284 | Schevenell | Oct. 6, 1953 |
| 2,740,315 | Gouverneur | Apr. 3, 1956 |
| 2,871,751 | Lemke | Feb. 3, 1959 |